(12) United States Patent
Fellmeth et al.

(10) Patent No.: US 9,273,673 B2
(45) Date of Patent: Mar. 1, 2016

(54) DEVICE FOR THROTTLING A FLUID FLOW, AND CORRESPONDING PISTON PUMP FOR DELIVERING FLUIDS

(75) Inventors: Reiner Fellmeth, Besigheim (DE); Juergen Haecker, Schwieberdingen (DE); Oliver Gaertner, Abstatt (DE); Heiko Jahn, Tamm (DE); Wolfgang Schuller, Cleebronn (DE); Rolf Stotz, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 13/819,990

(22) PCT Filed: Jul. 6, 2011

(86) PCT No.: PCT/EP2011/061417
§ 371 (c)(1),
(2), (4) Date: May 13, 2013

(87) PCT Pub. No.: WO2012/028364
PCT Pub. Date: Mar. 8, 2012

(65) Prior Publication Data
US 2013/0224046 A1    Aug. 29, 2013

(30) Foreign Application Priority Data
Sep. 2, 2010 (DE) .......................... 10 2010 040 169

(51) Int. Cl.
*F04B 7/00* (2006.01)
*B60T 8/40* (2006.01)
(Continued)

(52) U.S. Cl.
CPC ................ *F04B 7/00* (2013.01); *B60T 8/4031* (2013.01); *B60T 8/4068* (2013.01); *F04B 1/0452* (2013.01);
(Continued)

(58) Field of Classification Search
CPC ............... F04B 39/0055; F04B 49/225; F04B 2205/172; F04B 2205/17; F04B 2205/171; F04B 7/00; F04B 1/0452; F04B 53/10; F04B 53/1077; F04B 39/10; F16K 15/141; G05D 7/012; B60T 8/4031; B60T 8/4068
USPC .......................................... 417/295
See application file for complete search history.

(56) References Cited

U.S. PATENT DOCUMENTS 3,552,444 A    1/1971    Levesque
3,664,774 A    5/1972    Tupper et al.
(Continued)

FOREIGN PATENT DOCUMENTS

CN          1187872 A        7/1998
DE    10 2006 027 555 A1    12/2007
(Continued)

OTHER PUBLICATIONS

International Search Report corresponding to PCT Application No. PCT/EP2011/061417, mailed Oct. 25 2011 (German and English language document) (7 pages).

*Primary Examiner* — Nathan J Newhouse
*Assistant Examiner* — Philip Stimpert
(74) *Attorney, Agent, or Firm* — Maginot, Moore & Beck LLP

(57) ABSTRACT

A device for throttling a fluid flow includes a basic body which has at least one throttle point with a predefinable opening cross section. The basic body has a resilient configuration at least in a region of the at least one throttle point. Accordingly, the opening cross section of the at least one throttle point is configured to be set in a variable manner as a function of a pressure difference.

7 Claims, 4 Drawing Sheets

(51) Int. Cl.
*F04B 1/04* (2006.01)
*F04B 39/10* (2006.01)
*F04B 53/10* (2006.01)
*G05D 7/01* (2006.01)
*F16K 15/14* (2006.01)

(52) U.S. Cl.
CPC ............... *F04B 39/10* (2013.01); *F04B 53/10* (2013.01); *F04B 53/1077* (2013.01); *F16K 15/141* (2013.01); *G05D 7/012* (2013.01)

(56) References Cited

U.S. PATENT DOCUMENTS

| | | | |
|---|---|---|---|
| 4,098,296 A | 7/1978 | Grasso et al. | |
| 5,759,014 A | 6/1998 | Van Lintel | |
| 5,819,707 A * | 10/1998 | Grytz et al. | 123/432 |
| 6,093,003 A | 7/2000 | Hauser et al. | |
| 6,450,787 B1 * | 9/2002 | Risch et al. | 417/569 |
| 6,465,787 B1 | 10/2002 | Coulter et al. | |
| 6,823,673 B2 * | 11/2004 | Cheng | B66F 3/42 251/120 |
| 2005/0191197 A1 | 9/2005 | Lee | |
| 2006/0108007 A1 | 5/2006 | Etheridge et al. | |

FOREIGN PATENT DOCUMENTS

| | | |
|---|---|---|
| DE | 10 2008 002 740 A1 | 12/2009 |
| WO | 2007/100579 A2 | 9/2007 |

\* cited by examiner

DEVICE FOR THROTTLING A FLUID FLOW, AND CORRESPONDING PISTON PUMP FOR DELIVERING FLUIDS

This application is a 35U.S.C. §371National Stage Application of PCT/EP2011/061417, filed on Jul. 6, 2011, which claims the benefit of priority to Serial No. DE 10 2010 040 169.2, filed on Sep. 2, 2010 in Germany, the disclosures of which are incorporated herein by reference in their entirety.

Background

The disclosure starts from a device for throttling a fluid flow according to the description below. In addition, the present disclosure relates to a piston pump for delivering fluids having a throttle device of this type.

Piston pumps are known from the prior art in various embodiments. For example, radial piston pumps having a plurality of pump elements for delivering pressure media are frequently used in vehicle brake systems, in which pumps at least one piston can be moved in a reciprocating manner by means of a cam. These so-called pump elements typically consist of a piston, a piston running surface frequently in the form of a cylinder, inlet and outlet valves, and sealing elements. The valves are used to control the fluid during the pumping movement of the piston. In this case the inlet valve serves to prevent the fluid from flowing back into the suction chamber during the compression phase, while the outlet valve prevents the fluid from flowing back from the pressure side into the interior of the pump. These valves are typically in the form of spring-loaded ball valves, the outflow channel for the outlet valve being formed by a so-called outlet valve cover and the pump cylinder, and the outlet valve being accommodated in the outlet valve cover.

For example, a piston pump for regulating brake pressure in a hydraulic vehicle brake system is described in the published patent application DE 10 2008 002 740 A1. The piston pump described comprises a pump housing, a receiving bore for the piston pump arranged in the pump housing and a valve cover closing the receiving pump to the outside, in which valve cover an outlet valve and first and second channel sections of an outflow channel are accommodated. The outflow geometry influences the noise behavior of the piston pump and for this reason is in most cases configured with a suitable narrowing of the outflow channel which then has a throttling effect.

A piston pump with reduced noise generation is described, for example, in the published patent application DE 10 2006 027 555 A1. The piston pump for delivering fluids described comprises a piston, a cylinder element and a pressure chamber which is arranged between an inlet valve and an outlet valve and is closed by a cover, wherein the outlet valve comprises a closing body in the form of a ball, a preloading device in the form of a spiral spring which acts on the closing body, a base element for supporting the preloading device, and a disk element, a sealing seat of the outlet valve being arranged on the disk element. The use of the disk element is intended to ensure that tolerances of different components of the piston pump do not negatively influence the outlet valve.

Summary

As compared to the above, the device according to the disclosure for throttling a fluid flow having the features described below has the advantage that a basic body of a throttle device behaves dynamically as pressure difference increases. This has the result that an opening cross section of at least one throttle point is adjusted variably as a function of the pressure difference.

The essence of the present disclosure consists in configuring the basic body of the throttle device to be resilient, so that the throttle device behaves dynamically with rising pressure difference. The throttle device according to the disclosure is configured in such a way that, in the event of deviations such as overpressures at low temperatures or an increased volume flow, it can adjust itself and open resiliently in an advantageous manner. An increased internal pressure, for example in a piston pump, and resulting damage to components, can thereby be avoided. A cost-optimized configuration of the components at a constant pressure level can therefore be achieved. In "normal operation", within the linear behavior of the fluid, fluid flows through the throttle point. If viscosity and therefore flow resistance increase as a result of temperature change, the cross section of the throttle point is slightly increased resiliently. Through a defined outflow direction on one side of the throttle device, the closing body of the outlet valve of the piston pump can be indexed to a preferred position which positively influences the noise behavior of the piston pump.

By virtue of the resilient basic body, which has an outflow channel at the throttle point, the dynamic throttle device according to the invention disclosure makes it possible for the outflow channel to widen in the event of a high-viscosity state of the fluid, so that a practically constant pressure difference is established at the throttle device. As a result of the dynamic throttle plate according to the disclosure, both the drive power and the stress on the power-transmitting individual parts such as bearings, piston, high-pressure sealing rings, etc., are reduced. Through the shaping of the basic body and of the throttle point, the throttling behavior can be adapted to function. Embodiments of the present throttle device therefore make possible an improved quality of the fluid system in which they are utilized. As a further advantage, clogging of the throttle point can advantageously be prevented by the dynamic behavior of the throttle device. With appropriate configuration, this can be exploited to save cost in future applications. The throttle device according to the disclosure can be used not only in conjunction with a piston pump but also for other assemblies of the fluid system.

The device according to the disclosure for throttling a fluid flow comprises a basic body having at least one throttle point with a predefinable opening cross section. According to the disclosure the basic body is of resilient configuration at least in the region of the at least one throttle point, so that the opening cross section of the at least one throttle point can be adjusted variably as a function of the pressure difference.

The piston pump according to the disclosure for delivering fluids comprises a piston, a cylinder element and a pressure chamber which is arranged between an inlet valve and an outlet valve and is closed by a cover, a throttle device according to the disclosure being arranged in the fluid flow downstream of the outlet valve. The piston pump according to the disclosure may be used, for example, for delivering pressure media in a vehicle brake system.

The measures and developments described below make possible advantageous improvements of the device for throttling a fluid flow specified below, and of the piston pump for delivering fluids specified below.

It is especially advantageous that the basic body has in the region of the at least one throttle point at least one spring arm which determines the opening cross section, and which adjusts the opening cross section of the at least one throttle point as a function of the pressure difference. The at least one throttle point has, for example, a minimum opening cross section and/or a maximum opening cross section independent of the pressure difference. This has the result that, in the unloaded state, the throttle point has an outflow channel with a predefined minimum opening cross section. Additionally or alternatively, the maximum cross section of the outflow channel of the throttle point may, for example, be limited by a stop in the loaded state. The minimum opening cross section of the at least one throttle point may advantageously be optimized for a volume flow within a predefined temperature range preferably from 0° C. to 120° C. As a result of temperature change, the viscosity of the fluid and therefore the flow resistance at the throttle point also change. The throttle point is now additionally widened thereby, so that, as a result of the resilient behavior, the clear cross section of the throttle point is enlarged, or a new clear cross section is established. Consequently, the pressure difference at the throttle point advantageously does not rise, in particular at low temperatures, and other components of the fluid system are not damaged.

In an advantageous configuration of the device according to the disclosure, selected spring characteristics and/or a selected structural shape of the basic body and/or a selected structural shape of the at least one throttle point determine the dynamic behavior of the opening cross section of the at least one throttle point during pressure difference changes. For example, the basic body may include a plurality of spring arms which determine the shape and dimensions of the at least one throttle point. The throttle point may be configured in such a way that a first opening with a preferred outflow channel is predefined by two first spring arms, and a second opening with a wider outflow channel, arranged downstream of the first opening in the fluid flow direction, is predefined by two second spring arms.

In a further advantageous configuration of the device according to the disclosure, the basic body is configured as an open ring with two spring arms, the ends of which determine the shape of the throttle point. Thus, the end faces of the two spring arms may be disposed, for example, parallel to one another and form an outflow channel the cross section of which remains constant over its length in the unloaded state. Alternatively, the end faces of the spring arms may be disposed obliquely, in such a way that the cross section of the outflow channel formed narrows in the fluid flow direction in the unloaded state. As a further alternative, the end faces of the spring arms may be of conical configuration, in such a way that the cross section of the outflow channel formed first narrows and then widens again in the flow direction in the unloaded state.

In a further advantageous configuration of the device according to the disclosure, the basic body may have a centering lobe for positionally correct installation. Furthermore, in order to optimize the resilient behavior of the spring arms the basic body may have a thickened portion at the base of the two spring arms, that is, on the side of the open ring opposite the throttle point.

In a further advantageous configuration of the device according to the disclosure, the basic body is implemented from round wire and/or flat wire or as a stamping, making possible cost-effective manufacture of the throttle device.

In an advantageous configuration of the piston pump according to the disclosure, the throttle device is placed between two flat surfaces of the cylinder element and the cover of the outlet valve of the piston pump, enabling simple installation of the throttle device.

Exemplary embodiments of the disclosure are represented in the drawings and are explained in more detail in the following description. In the drawings the same reference numerals denote components or elements having the same or analogous functions.

Detailed Description

Figure 1:
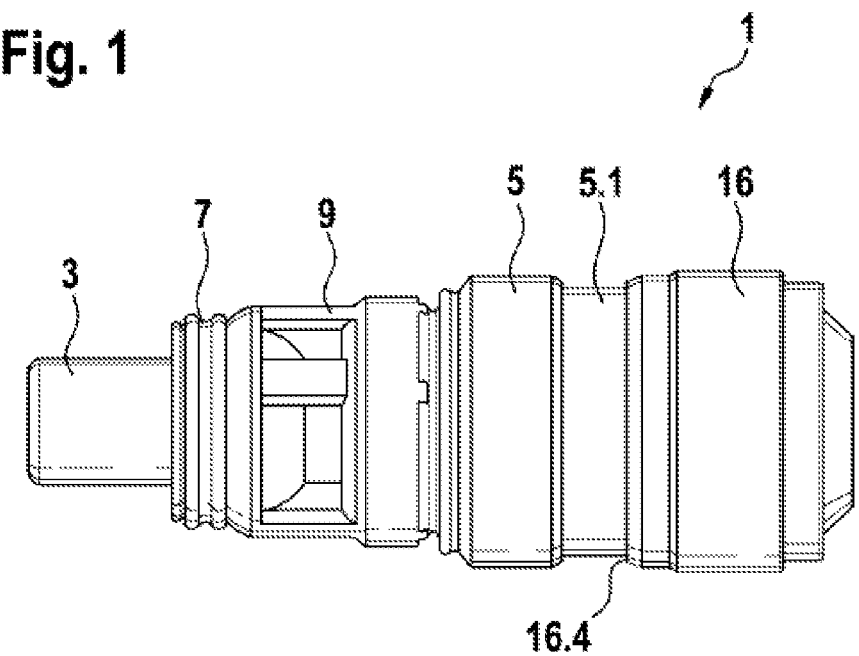
FIG. 1 is a schematic perspective representation of an exemplary embodiment of a piston pump for delivering fluids according to the disclosure.
Figure 2:
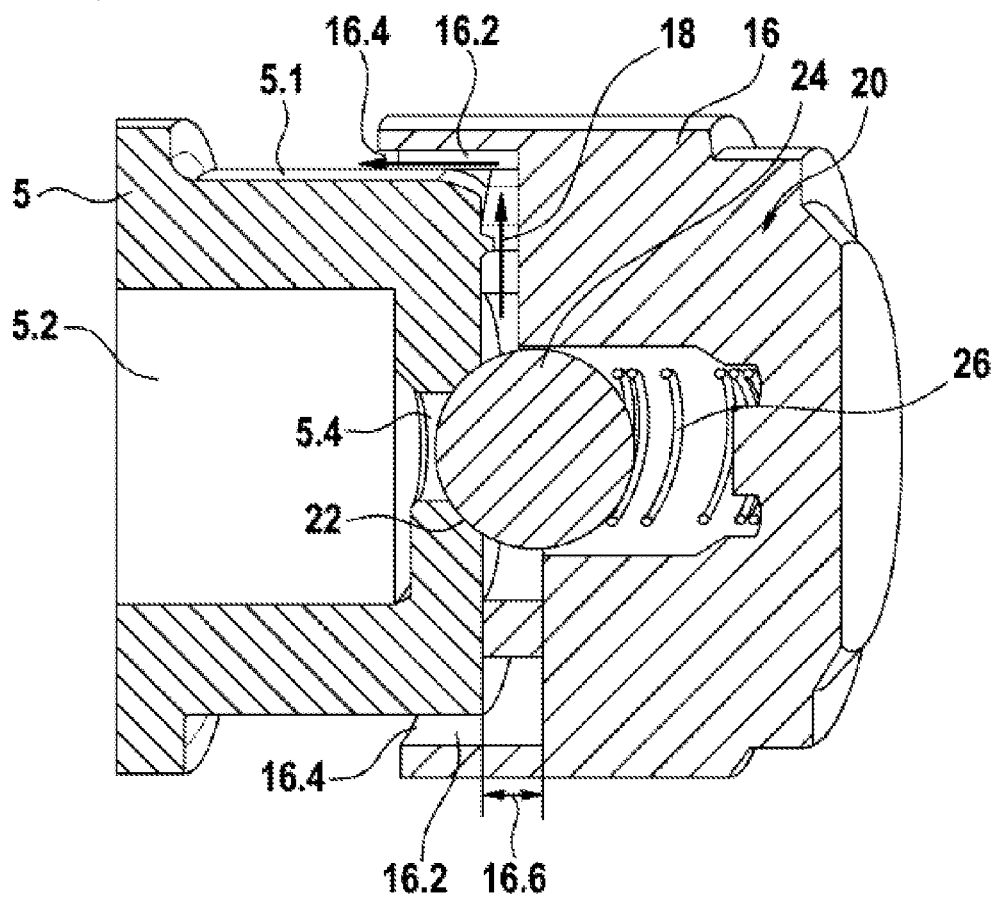
FIG. 2 shows a perspective cross section through a rear portion of the piston pump for delivering fluids represented in FIG. 1, in order to show the installation space of a device for throttling a fluid flow according to the disclosure.
Figure 3:
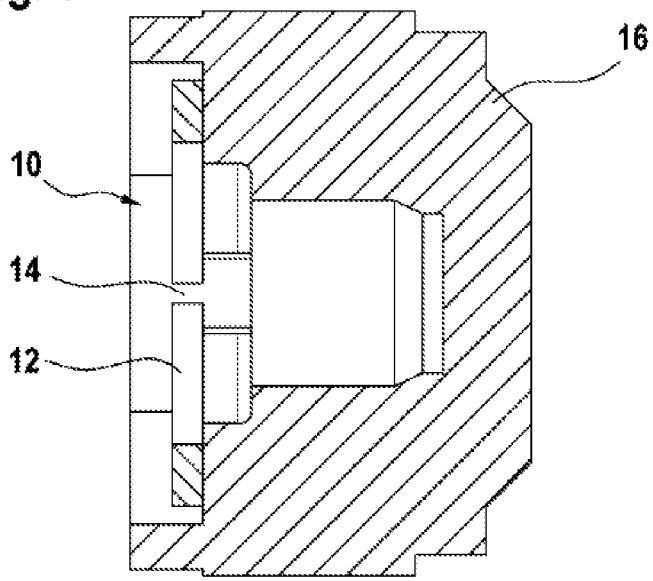
FIG. 3 shows a perspective cross section through a cover of the outlet valve of the piston pump for delivering fluids represented in FIGS. 1 and 2, with an installed device for throttling a fluid flow according to the disclosure.

As can be seen from FIGS. 1 to 3, a piston pump 1 for delivering fluids according to the disclosure comprises a piston 3, a cylinder element 5, a sealing element 7 and a fluid filter 9 which is arranged upstream of an inlet opening (not visible), downstream of which an inlet valve (not visible) is arranged. A pressure chamber 5.2, which is closed by a cover 16 in which the outlet valve 20 is arranged, is located in the interior of the cylinder element 5 between the inlet valve (not shown) and the outlet valve 20. The cover 16 is pressed onto a rear part of the cylinder element 5 in the form of a shoulder 5.1, in such a way that at least one fluid channel 16.2 and at least one outflow opening 16.4 are formed between the cover 16 and the shoulder 5.1. The piston pump 1 according to the disclosure which is represented may be arranged, for example, in a receiving bore (not shown) of a pump housing or a fluid block. Transversely disposed pressure medium channels may open into the receiving bore, through which channels fluid is directed via the fluid filter 9 to the inlet opening of the piston pump 1 and is conducted away from the at least one outflow opening 16.4 of the piston pump 1.

As is further apparent from FIG. 2, the outlet valve 20 comprises a sealing seat 22 arranged on an outlet opening 5.4 of the pressure chamber 5.2, a closing body preferably in the form of a ball, and a return spring 26 acting on the closing body 24. A device 10 for throttling the fluid flow 18, comprising a basic body 12 and a throttle point 14, is provided downstream of the outlet valve in the fluid flow 18, in order to reduce noise generation. For this purpose an installation space 16.6 for the throttle device 10, delimited by a flat surface on the end face of the cylinder element 5 and a flat, inwardly-stepped surface of the cover 16, is provided between the cylinder element 5 and the cover 16. Before the cover 16 is pressed onto the shoulder 5.1 of the cylinder element, the throttle device 10 is placed into the cover 16, as can be seen from FIG. 3.

The cover 16 may be produced in known fashion either by machining or by non-cutting shaping, the non-cutting shaping method being appropriate for large-volume production from an economic point of view. The outflow geometry influences the noise behavior of the piston pump 1 and is therefore configured appropriately. In piston pumps known from the prior art, this configuring usually takes the form of a suitable narrowing of the outflow channel, which then has a throttling effect. This throttling effect produces a hydraulic low-pass which has a positive influence on undesired noise generation. The behavior of the dynamic viscosity of the brake fluid in the range from 0° C. to 120° C. can be regarded as practically constant, and the optimum throttling effect is defined for this temperature range. As a result of the major change in the kinematic viscosity of the brake fluid over the required temperature range from −40° C. to 120° C., the throttle, above all at low temperatures, stresses the pressure-loaded components of the piston pump and of the entire pump drive. At low temperatures, as a result of the constricted cross section, significantly increased fluid friction is registered, leading to a marked overpressure in the pump interior and the resulting above-mentioned stresses.

According to the disclosure, the basic body 12 of the throttle device 10 is of resilient configuration at least in the region of the at least one throttle point 14, so that the opening cross section of the at least one throttle point 14 is variably adjustable as a function of the pressure difference. As a result, embodiments of the present disclosure are advantageously able to adapt their throttling behavior, or their opening cross section, dynamically to the prevailing pressure difference. For this purpose the basic body 12 has in the region of the at least one throttle point 14 at least one spring arm which determines the opening cross section and adjusts the opening cross section of the at least one throttle point 14 as a function of the pressure difference.

In the exemplary embodiment represented, the at least one throttle point 14 has a minimum opening cross section which is independent of the pressure difference and is optimized, as a function of the desired throttle behavior, to a volume flow within a predetermined temperature range preferably from 0° C. to 120° C. As a result of temperature change, the viscosity of the fluid, and therefore the flow resistance at the predefined minimum throttle cross section of the throttle point 14, also change. As a result of the resilient configuration of the basic body 12 in the region of the throttle point 14, the throttle point 14 is widened, so that the clear cross section is increased and a new cross section is established. The internal pressure of the piston pump 1 therefore advantageously does not increase, especially at low temperatures, so that other components of the piston pump 1 are not damaged. A maximum opening cross section of the throttle point 14 independent of the pressure difference may be predetermined, for example by the existing installation space 16.6 or by a stop. The dynamic behavior of the opening cross section of the at least one throttle point 14 during pressure difference changes can advantageously be determined by the selection or specification of the spring characteristics and/or of the structural shape of the basic body 12 and/or of the structural shape of the at least one throttle point 14.

As can be seen from FIGS. 4 to 13, the basic body 12, 32, 112, 122, 212, 222, 232, 312, 322, 332 of the throttle device 10, 30, 110, 120, 210, 220, 230, 310, 320, 330 is implemented in the embodiments represented as an open ring having at least two spring arms 12.1, 12.2, 32.1, 32.2, 32.3, 32.4, 112.1, 112.2, 122.1, 122.2, 212.1, 212.2, 222.1, 222.2, 232.1, 232.2, 312.1, 312.2, 322.1, 322.2, 332.1, 332.2, the ends of which determine the shape of the respective throttle point 14, 34.1, 34.2, 114, 124, 214, 224, 234, 314, 324, 334.

As is further apparent from FIGS. 4 to 13, the basic body 12, 32, 112, 122, 212, 222, 232, 312, 322, 332 of the respective throttle device 10, 30, 110, 120, 210, 220, 230, 310, 320, 330 may be produced from round wire and/or flat wire and/or as a stamping.

Figure 4:
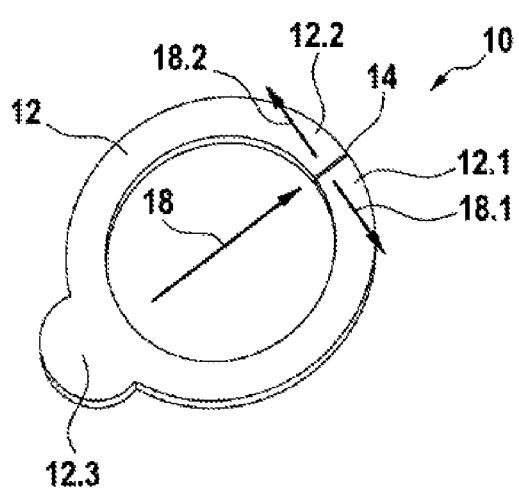
FIGS. 4 to 13 each show a respective exemplary embodiment of the device for throttling a fluid flow according to the disclosure.

In the exemplary embodiment represented in FIG. 4, the basic body 12 of the throttle device 10 is in the form of a stamping having a throttle point 14 and a centering lobe 12.3 arranged on the basic body 12 opposite the throttle point 14. The centering lobe 12.3 advantageously enables positionally correct installation of the basic body 12. As is further apparent from FIG. 4, the predefined minimum opening cross section of the throttle point 14, the shape of which is determined by two spring arms 12.1, 12.2, makes possible an increasing fluid flow 18 through the outflow channel of the throttle point 14 up to a pressure difference threshold value determined by the spring behavior. If the pressure difference rises above the pressure difference threshold value, the two spring arms 12.1, 12.2 are spread apart in the direction indicated by the arrows 18.1, 18.2, so that the opening cross section of the throttle point 14 and a flow quantity Q of the fluid are increased and the effective pressure difference is reduced.

Figure 5:
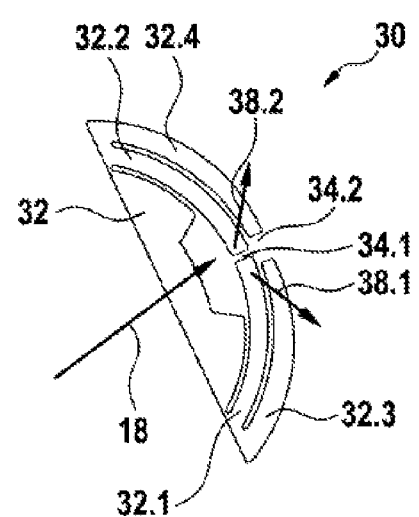

FIG. 5 shows as an alternative a throttle device 30 produced as a stamping and having four spring arms 32.1, 32.2, 32.3, 32.4 and two throttle points 34.1, 34.2 which are arranged one behind the other in the flow direction. As is further apparent from FIG. 5, the predefined minimum opening cross section of the first throttle point 34.1, the shape of which is determined by two first spring arms 32.1, 32.2, makes possible an increasing fluid flow 18 through the outflow channel of the throttle points 34.1, 34.2 up to a pressure difference threshold value determined by the spring behavior. If the pressure difference rises above the pressure difference threshold value, the two first spring arms 32.1, 32.2 are spread apart in the directions indicated by the arrows 38.1, 36.2, so that the opening cross section of the first throttle point 34.2 and a flow quantity Q of the fluid are increased and the effective pressure difference is reduced. In an analogous way, the second throttle point 34.2, the shape of which is determined by two second spring arms 32.3, 32.4, enables a second pressure difference threshold value to be specified.

Figure 6:
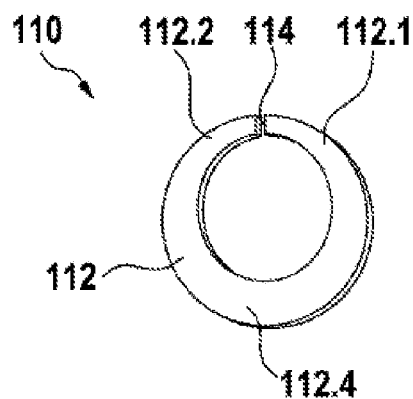

In the exemplary embodiment represented in FIG. 6, the basic body 112 of the throttle device 110 is in the form of an open ring of flat wire having two spring arms 112.1, 112.2 and a throttle point 114. In order to optimize the spring characteristics of the spring arms 112.1, 112.2, a thickened portion 112.4 is arranged on the basic body 112 opposite the throttle point 114. The shape of the predefined minimum opening cross section of the throttle point 114 is determined by the two spring arms 112.1, 112.2 through the shape of their end faces. As can further be seen from FIG. 6, the end faces of the two spring arms 112.1, 112.2 are disposed parallel to one another and form an outflow channel the cross section of which is constant over its length in the unloaded state shown. The functioning of the embodiment represented in FIG. 6 corresponds to that described in connection with FIG. 4, so that the description will not be repeated here.

Figure 7:
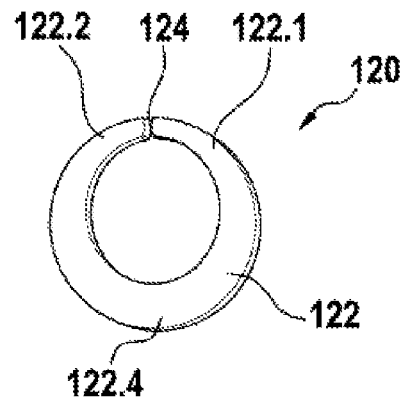

In the exemplary embodiment shown in FIG. 7, the basic body 122 of the throttle device 120 is in the form of an open ring of round wire having two spring arms 122.1, 122.2 and a throttle point 124. In order to optimize the spring characteristics of the spring arms 122.1, 122.2, a thickened portion 122.4 is likewise arranged on the basic body 122 opposite the throttle point 124. Analogously to the exemplary embodiment shown in FIG. 6, in the exemplary embodiment represented in FIG. 7 the end faces of the two spring arms 122.1, 122.2 are also disposed parallel to one another and form an outflow channel the cross section of which is constant over its length in the unloaded state shown. The functioning of the embodiment represented in FIG. 7 also corresponds to that described in connection with FIG. 4, so that the description will not be repeated here.

Figure 8:
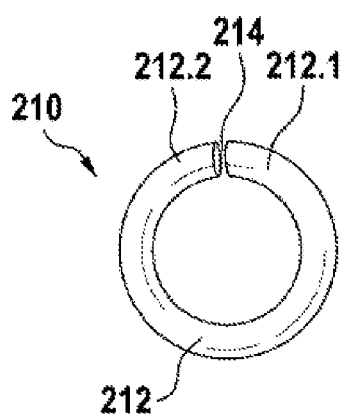
Figure 9:
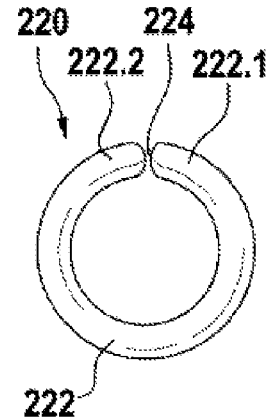
Figure 10:
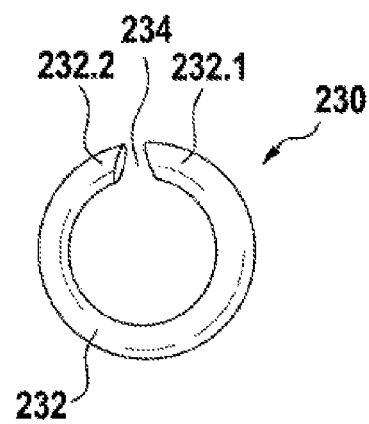

In the exemplary embodiments represented in FIGS. 8 to 10, the basic bodies 212, 222, 232 of the throttle devices 210, 220, 230 are each implemented as open rings of round wire and have two spring arms 212.1, 212.2, 222.1, 222.2, 232.1, 232.1, and one throttle point 214, 224, 234 in each case. The exemplary embodiments shown in FIGS. 8 to 10 differ by the shapes of the predefined minimum opening cross sections of the throttle points 214, 224, 234. As can further be seen from FIG. 8, the end faces of the two spring arms 212.1, 212.2 are disposed parallel to one another here and form an outflow channel the cross section of which is constant over its length in the unloaded state shown. As can further be seen from FIG. 9, the end faces of the two spring arms 222.1, 222.2 are here of conical configuration and form an outflow channel the cross section of which, in the unloaded state shown, first narrows and then widens again in the flow direction. As can further be seen from FIG. 10, the end faces of the two spring arms 232.1, 232.2 are each disposed obliquely here and form an outflow channel the cross section of which narrows in the flow direction in the unloaded state shown. The functioning of the embodiments represented in FIGS. 8 to 10 corresponds to that described in connection with FIG. 4, so that the description will not be repeated here.

Figure 11:
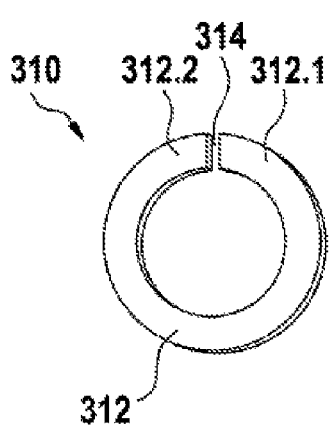
Figure 12:
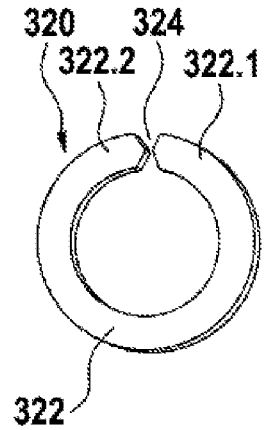
Figure 13:
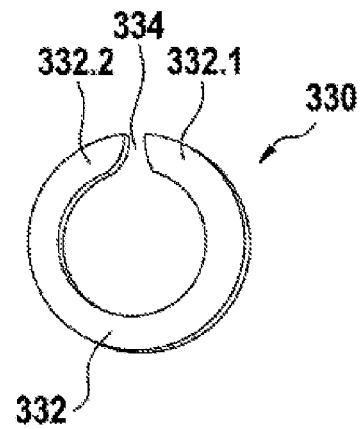

In the exemplary embodiments represented in FIGS. 11 to 13, the basic bodies 312, 322, 332 of the throttle devices 310, 320, 330 are each implemented as open rings of flat wire and/or as stampings having two spring arms 312.1, 312.2, 322.1, 322.2, 332.1, 332.1 and one throttle point 314, 324, 334 in each case. The exemplary embodiments shown in FIGS. 11 to 13 differ by the shapes of the predefined minimum opening cross sections of the throttle points 314, 324, 334. As can further be seen from FIG. 11, the end faces of the two spring arms 312.1, 312.2 are disposed parallel to one another here and form an outflow channel the cross section of which is constant over its length in the unloaded state shown. As can further be seen from FIG. 12, the end faces of the two spring arms 322.1, 322.2 are here of conical configuration and form an outflow channel the cross section of which, in the unloaded state shown, first narrows and then widens again in the flow direction. As can further be seen from FIG. 13, the end faces of the two spring arms 332.1, 332.2 are each disposed obliquely here and form an outflow channel the cross section of which narrows in the flow direction in the unloaded state shown. The functioning of the embodiments represented in FIGS. 11 to 13 corresponds to that described in connection with FIG. 4, so that the description will not be repeated here.

Figure 14:
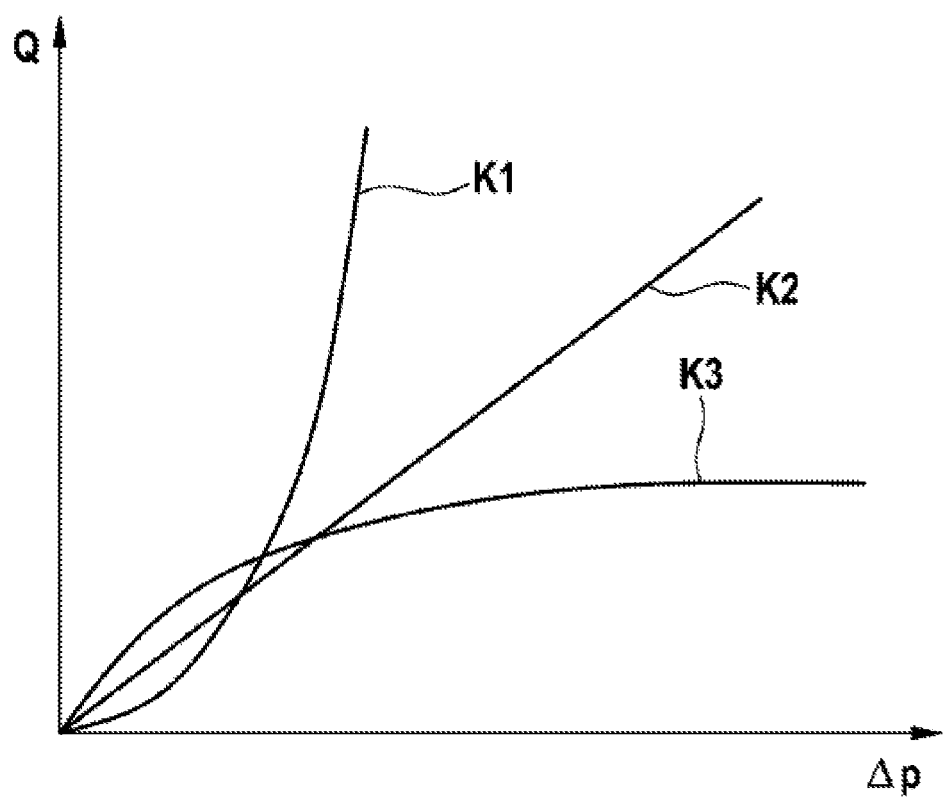
FIG. 14 is a characteristic curve diagram with a plurality of characteristic curves representing the dynamic flow behavior of embodiments of the device for throttling a fluid flow according to the disclosure, in comparison to a throttle device with constant cross section.

FIG. 14 is a characteristic curve diagram with a number of characteristic curves representing the dynamic flow behavior of embodiments of the throttle device according to the disclosure 10, 30, 110, 120, 210, 220, 230, 310, 320, 330 in comparison to a throttle device represented by a characteristic curve K3 with a throttle point which has a constant cross section independent of differential pressure. As can further be seen from FIG. 14, the through-flow quantity Q of fluid according to characteristic curve K3 first increases strongly with increasing pressure difference Δp and then follows an almost constant course independent of the increasing pressure difference Δp.

In FIG. 14 a characteristic curve K2 represents the dynamic behavior of the embodiments from FIGS. 6 and 7. As is further apparent from FIG. 14, the through-flow quantity Q of fluid according to characteristic curve K1 follows a degressive course, that is, the through-flow quantity Q first rises slowly with the increasing pressure difference Δp, and then shows a sharp rise from a given pressure difference threshold value in order to prevent a further rise of pressure difference.

In FIG. 14 a characteristic curve K3 represents the dynamic behavior of the embodiments from FIGS. 8 to 13. As can further be seen from FIG. 14, the through-flow quantity Q of fluid according to characteristic curve K2 follows a linear course the gradient of which can be determined by the configuration of the basic body and the throttle point.

Embodiments of the present disclosure advantageously make possible very good NVH behavior (NVH: Noise, Vibration, Harshness). By means of the resilient throttle device the pressure difference upstream and downstream of the throttle device can advantageously be maintained constant with a high-viscosity state of the fluid. The drive power and the stress on force-transmitting individual parts such as bearings, piston, high-pressure seals, etc., are thereby reduced. With appropriate configuration, this can be exploited to save cost in future applications. In addition, as a result of the shaping of the throttle point, the throttling behavior can advantageously be adapted to function.

The invention claimed is:

1. A piston pump for delivering fluids, comprising:
a piston;
a cylinder element;
a pressure chamber arranged between an inlet valve and an outlet valve; and
a throttling mechanism configured to throttle a fluid flow and arranged downstream of the outlet valve in the fluid flow, wherein the throttling mechanism is a device including:
a basic body which includes at least one throttle point having a predefinable opening cross section, wherein the basic body is an open ring having at least one pair of spring arms each pair forming arcs of an imaginary circle, so that the opening cross section of the at least one throttle point is defined on the circumference of the imaginary circle between free ends of the spring arms and is variably adjustable as a function of a pressure difference.

2. The piston pump as claimed in claim 1, wherein the device is placed between two flat surfaces of the cylinder element and the cover.

3. The piston pump of claim 1 wherein the at least one throttle point has at least one of a minimum opening cross section and a maximum opening cross section independent of the pressure difference.

4. The piston pump of claim 1, wherein the minimum opening cross section of the at least one throttle point is optimized to a volume flow within a predetermined temperature range.

5. The piston pump of claim 1, wherein a dynamic behavior of the opening cross section of the at least one throttle point is configured to change during pressure difference changes according to at least one of selected spring characteristics, a selected structural shape of the basic body, and a selected structural shape of the at least one throttle point.

6. The piston pump of claim 1, wherein the basic body has a centering lobe configured to enable positionally correct installation.

7. The piston pump of claim 1, wherein the basic body is at least one of a round wire, a flat wire, and a flat plate.

* * * * *